United States Patent [19]

Giacometti

[11] Patent Number: 4,738,273

[45] Date of Patent: Apr. 19, 1988

[54] APPARATUS FOR CONTINUOUS COOLING OF ELONGATED ELEMENTS

[75] Inventor: Osvaldo Giacometti, Aclens, Switzerland

[73] Assignee: Maillefer S.A., Switzerland

[21] Appl. No.: 875,990

[22] Filed: Jun. 19, 1986

[30] Foreign Application Priority Data

Jul. 5, 1985 [CH] Switzerland .................. 2904/85

[51] Int. Cl.$^4$ ............................................. B08B 3/04
[52] U.S. Cl. .................. 134/114; 134/122 R; 277/212 F; 266/120
[58] Field of Search ............ 134/64 P, 64 R, 122 R, 134/199, 114; 266/114, 120; 277/212 F; 68/5 E

[56] References Cited

U.S. PATENT DOCUMENTS

| | | | |
|---|---|---|---|
| 890,252 | 6/1908 | Thompson | 68/5 E |
| 2,606,046 | 8/1952 | Bonner et al. | 68/5 E |
| 3,509,890 | 5/1970 | Phillips | 134/122 R |
| 4,033,785 | 7/1977 | Gibbs | 134/64 R X |
| 4,414,917 | 11/1983 | Bentley et al. | 134/64 R X |
| 4,609,773 | 9/1986 | Brown et al. | 277/212 F X |

Primary Examiner—Harvey C. Hornsby
Assistant Examiner—Frankie L. Stinson
Attorney, Agent, or Firm—Parkhurst & Oliff

[57] ABSTRACT

An assembly of gates is provided at each end of a vat. Two uprights mounted on a lock-chamber floor support respective brackets. Pivoted between the floor and the brackets are gate flaps, the pivot rods of which are fitted in holes in the floor and in the brackets. Each gate flap includes a notch, and the successive gates match successive diameters of elongated elements which travel through the vat. In case of localized excess thickness on an elongated element, the impact causes spontaneous opening of the gate guiding the element.

6 Claims, 3 Drawing Sheets

APPARATUS FOR CONTINUOUS COOLING OF ELONGATED ELEMENTS

BACKGROUND OF THE INVENTION

This invention relates to the manufacture of plastic objects by extrusion, and more particularly to apparatus for the continuous cooling of elongated elements of plastic material at the end of a production line, of the type comprising an elongated enclosure having endwalls adapted to allow the passage of the elongated element and capable of retaining a liquid contained in the enclosure when the elongated element is in place.

In installations designed for the continuous extrusion of elongated elements such as plastic tubes or insulating sheaths for copper conductors, for example, elongated cooling vats, generally of sheet metal, are placed just next to the extrusion head. The endwalls of such vats include apertures through which the plastic element enters and leaves the vat. When there is no need for calibrating devices, it suffices for the apertures to match the cross-section of the plastic element in order to prevent major leakage of water between the element and the edge of the aperture. These vats have hitherto been no more than water-tight enclosures of welded sheet metal, open at the top and with apertures in each of the endwalls. Such enclosures are provided with the necessary connections for the water supply and for drainage, as well as with fixtures for mounting rollers or guiderolls placed in the bottom of the vat to support the elongated element when it is of a relatively large diameter.

However, the electronic control of extrusion installations now makes it possible to pass very quickly and easily from production of an element of one size to production of an element of a different size. Now, with vats of conventional design, every time a line is started up for manufacturing an element of a given size, e.g., a wire or cable, this element must be passed through the entry and exit apertures of the vat, the vat itself having been completely changed in many cases in order for the apertures to be adapted to the new diameter. It was this situation which prompted research into a new vat design.

It is therefore the object of this invention to provide improved cooling apparatus which, while relatively simple, can easily be adapted to the diameters or cross-sections of various elongated elements in order to simplify the starting-up of a production line when there is a change in dimensions.

BRIEF SUMMARY OF THE INVENTION

In the cooling apparatus according to the present invention, of the type initially mentioned, each endwall includes an assembly of gates, the different gates of each assembly have apertures adapted to different cross-sections of elongated elements, and the gates are individually movable between an open position and a closed position.

BRIEF DESCRIPTION OF THE DRAWINGS

A preferred embodiment of the invention will now be described in detail with reference to the accompanying drawings, in which.

DESCRIPTION OF THE PREFERRED EMBODIMENTS

Figure 1:
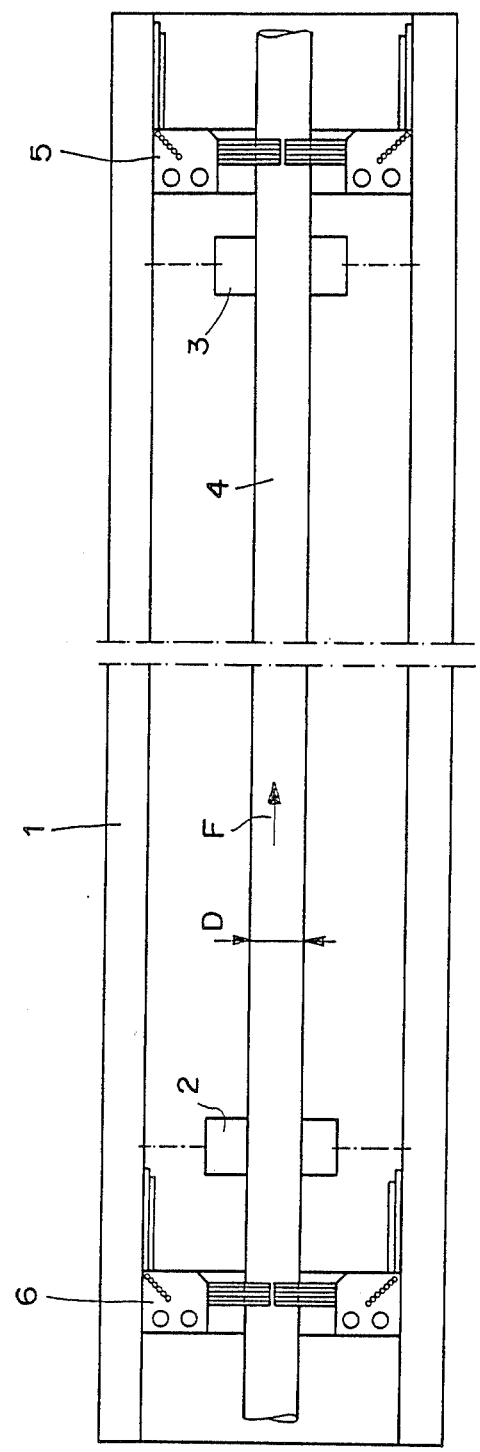
FIG. 1 is a top plan view of the apparatus on a small scale.
Figure 2:
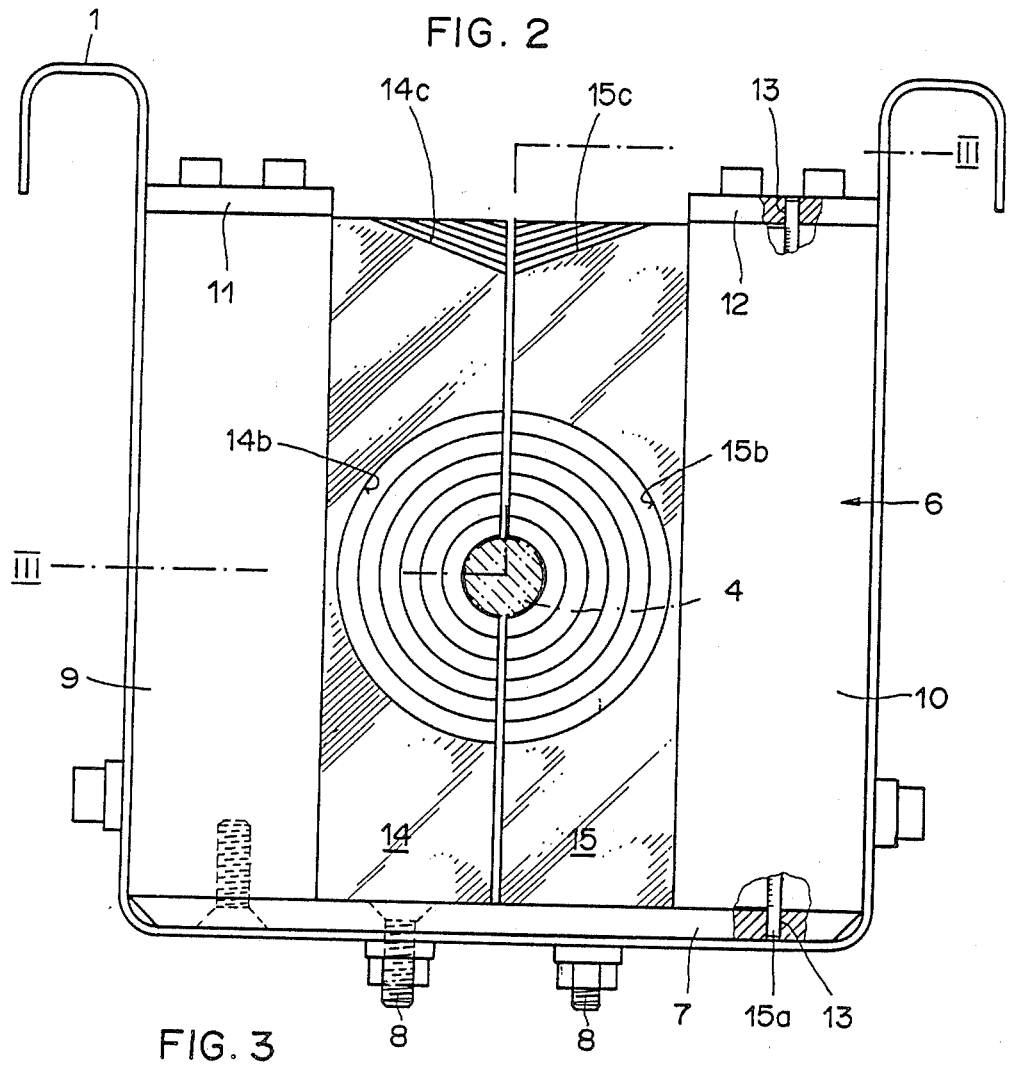
FIG. 2 is an end-on elevation of the entry side.

The vat shown in FIG. 1 comprises a main casing 1 of sheet metal bent into a U shape, as may also be seen in FIG. 2. Mounted inside the vat are rolls 2 and 3 which pivot about horizontal transverse axes to support an elongated element 4, e.g., an electric cable provided with plastic insulation. This cable emerges from an extrusion head (not shown) in which the metal part is coated with a layer of insulating plastic material of circular cross-section having a predetermined diameter D. The vat is closed at each end by two gate assemblies 5 and 6 forming the respective endwalls. Since element 4 moves in the direction indicated by arrow F, assembly 6 comprises the entry gates and assembly 5 the exit gates. Each assembly includes a number of double-flap gates, and each flap pivots about a vertical axis so as to be able to open in the direction of travel represented by arrow F. Each gate bounds an aperture fitted to a particular value of diameter D. When the vat is in use, a number of gates of each assembly 5 or 6 are closed, while the flaps of other gates are open, so that the elongated element passes through a series of pairs of semicircular notches, the smallest pair forming a circle fitted to diameter D.

Figure 3:
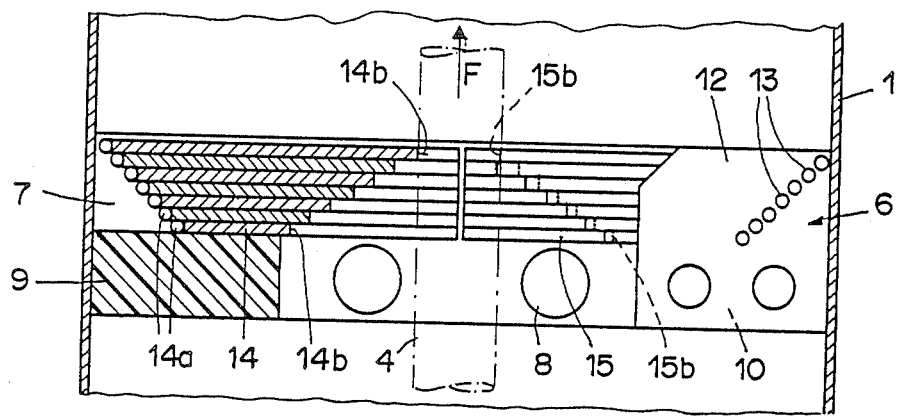
FIG. 3 is a section taken on the line III—III of FIG. 2.

FIGS. 2 and 3 show the entry endwall with gates 6. At the foot of the wall is a lock-chamber floor 7 in the form of a thick plate fixed in the bottom of the vat by screws 8. Near the vertical walls of casing 1, floor 7 supports two uprights 9 and 10 of rectangular cross-section, to the tops of which are fixed brackets 11 and 12 consisting of flat plates cantilevered from uprights 9 and 10 toward the interior of the vat. Floor 7 and brackets 11 and 12 each include vertical-axis holes 13 for pivoting the gate flaps, as will be explained below. In the embodiment being described, assembly 6 comprises seven gates 6, each composed of two flaps 14 and 15. Each flap 14 or 15 is composed of a flat piece of sheet metal, the outer edge of which is blanked with a prolongation forming a pivot pin 14a or 15a. These pins extend beyond the tops of flaps 14 and 15 and are fitted in diameter to holes 13. In addition, halfway up the inner edge of each flap 14 or 15 is a semicircular notch 14b or 15b corresponding to a predetermined diameter of an elongated element. As may be seen in FIGS. 2 and 3, notches 14b and 15b of the pairs of flaps 14 and 15 constituting the seven successive gates provided for in this embodiment form circles whose diameters decrease gradually from the first gate, where the flaps are situated just next to uprights 9 and 10, to the last gate, which is situated inside the vat. Thus, when all the gates are closed, as illustrated in FIGS. 2 and 3, the element 4 capable of passing through the vat under these conditions will have the minimum diameter matching that of the circle formed by notches 14b and 15b of the last gate. If, on the other hand, the elongated element is of the maximum dimaeter, all the gates will be open except the first one.

In order to facilitate the starting-up operations, all the flaps 14 and 15 have chamfers 14c and 15c at their upper inside corners, so that each flap may thus be individually manipulated. Pivot holes 13 for rods 14a and 15a of the gate flaps are aligned along two lines diverging at a 45° angle in the direction of travel of element 4, so that each flap can pivot through an angle of 90°, and the open position is parallel to the longitudinal axis of the vat, whereas the closed position is transverse. The width of the flaps is thus different for the different gates. In assembly 6, the gate flaps having the largest-diameter notches are the narrowest, while the gate flaps provided for the narrowest elongated element, i.e., the ones having the smallest-diameter notches 14b and 15b, are the widest gate flaps. The arrangement of gate assembly 5 is exactly the same except that the gate flaps are situated toward the outside of the floor and open outward, whereas in gate assembly 6, the gate flaps open toward the inside of the vat.

Figure 4:
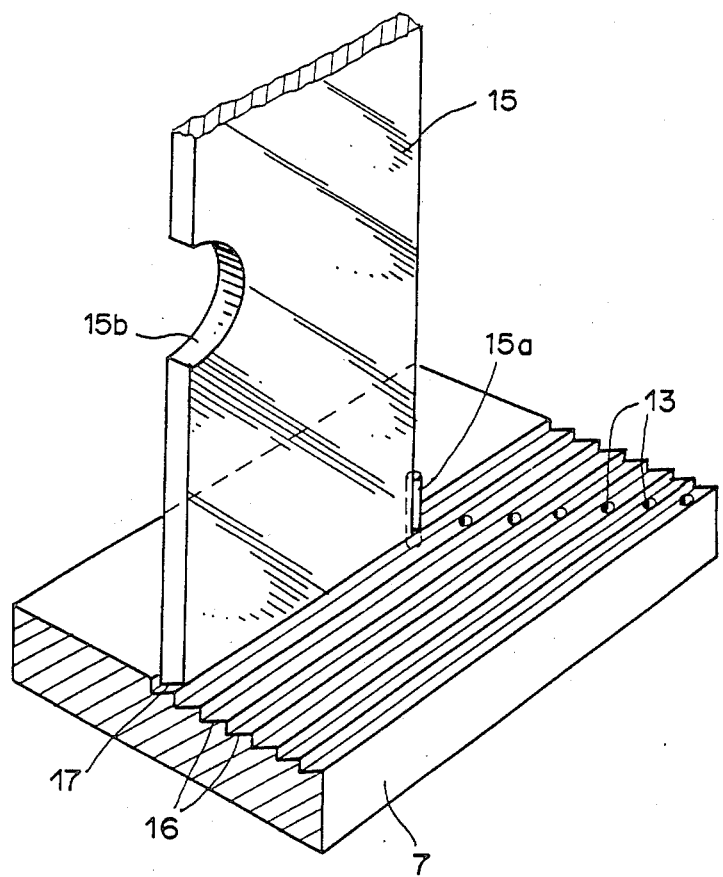
FIG. 4 is a diagrammatical partial perspective view showing the pivoting of a gate flap and the holding means of the lock-chamber floor.

The gate assemblies described should also act as safety elements, and in order for them to perform this function, it is also necessary to provide means for keeping the gates closed. These means are shown in FIG. 4. For when the vat has been arranged for the passage of a plastic element of a predetermined diameter, those gates which remain closed must hold back the mass of water filling the vat; but the gate having notches corresponding to the diameter of the element must be able to open easily in the event that, as a result of some irregularity, the outside surface of the element should exhibit locally thickened portions liable to snag on the notch of the gate. For if the gate were to remain fixed in such a case, this might result in a long tear on the elongated element, whereas if the pivoting gate can open easily, such a drawback is avoided. Hence in the present design, the gates are not latched or bolted closed but simply held in place by the means shown in FIG. 4. As may be seen, these means consist of a set of parallel transverse grooves 16 in the upper surface of floor 7. The width of grooves 16 corresponds to the thickness of gate flaps 14 and 15, and they have a sawtooth cross-section, the vertical flank of which is situated on the side opposite the opening direction of the gate. Moreover, the height of each of flaps 14 and 15 is slightly less than the height of uprights 9 and 10 and, consequently, than the distance between the opposing faces of floor 7 and brackets 11 and 12. Pivot rods 14a and 15a of the gate flaps therefore have a certain amount of axial play corresponding to the depth of grooves 16 of floor 7. When any impact occurs for the reasons mentioned above, the gate flap having the notch matching the elongated element to be treated is therefore able to lift slightly. For that purpose, its bottom edge has a bevel 17 which allows it to open under the effects of such an impact.

Thus, not only does the design described above make it possible to use the same vat for elongated elements of different diameters, but the insertion of the element, i.e., the starting-up of the production line, is also very simple since when the gates are open, the element can be placed in the vat from above with a motion of translation, without having to thread it first through an entry aperture and then through an exit aperture. Once the element is in place and resting on rolls 2 and 3, the gates having notches corresponding to a larger diameter than that of the element can be successively closed until the one exactly fitting it is reached, the other gates remaining open. Thereafter, the vat can be filled with water and the production line started up. Finally, as stated above, this design offers the additional advantage of security because if a gate flap receives an impact due to a hump or projection on the elongated element passing through the notch, that flap can open spontaneously and avoid damage to the sheath of the cable, the coating of the wire, or the plastic tube emerging from the extruder head.

For assembly 6, the pressure of the water is exerted in the direction of the closing of the gates, so that the flaps 14 and 15 are pressed one against the other, the end flaps being pressed against uprights 9 and 10. For assembly 5, on the other hand, the pressure of the water acts in the opening direction. At this location, holding means 16 and 17 must be so arranged that they offer the necessary security against any inopportune opening while nonetheless allowing opening in the event of impact. Generally speaking, the design described is that of a lock-chamber, and the closure of the endwalls around the elongated element need not be absolutely fluid-tight. The ends of the vat may comprise receptacles and collectors for recovering any leakage. On the other hand, in cases where the elongated elements have a non-circular cross-section, the gate assemblies will be provided with notches of an appropriate shape. In other embodiments, the gate system of the apparatus might be different from that illustrated in the drawings while still comprising gates capable of being opened and closed individually, each matching a particular crosssection of an elongated element.

What is claimed is:

1. An apparatus for the continuous cooling of elongated elements at the end of a production line, of the type comprising an elongated enclosure having two endwalls including respective apertures for the passage of said elongated elements, said endwalls being capable of retaining a liquid contained in said enclosure when said elongated element is in place, wherein the improvement comprises:
    a number of gates included in each of said endwalls and comprising a corresponding number of apertures respectively fitted to a number of different cross-sections of said elongated elements, said gates being movable individually between an open position and a closed position,
    each of said gates comprising at least one pair of symmetrical flaps, each of said flaps pivoting about a vertical axis to the open and closed positions, and each of said flaps including on the edge thereof nearest an opposing flap of the pair of flaps a notch having the shape of one-half the cross-section of one of said elongated elements, and
    holding means for maintaining said gates in said closed position but to allow said gates to move into said open bosition in response to an impact between a portion of one of said elongated elements and said notch in said flap,
    said apparatus further comprising a lock-chamber floor associated with said gates of each of said endwalls, said holding means being associated with said lock-chamber floor.

2. The apparatus of claim 1, wherein said holding means comprise straight, parallel grooves in said floor, said flaps fitting into said grooves when said gates are in said closed position.

3. The apparatus of claim 2, wherein said grooves have a sawtooth cross-section, said flaps having bevelled bottom edges matching said grooves.

4. The apparatus of claim 3, further comprising a pair of brackets mounted at the top of said elongated enclosure, said flaps each being pivoted with axial play between a respective one of said brackets and said floor.

5. The apparatus of claim 3, wherein the pivoting axes of said flaps are offset relative to one another longitudinally and laterally with respect to said elongated enclosure.

6. An apparatus for the continuous cooling of different cross-sectional sized elongated elements at the end of a production line, of the type comprising an elongated enclosure hvaing two endwalls including respective apertures for the passage of said elongated elements, said endwalls being capable of retaining a liquid contained in said enclosure when said elongated element is in place, wherein the improvement comprises:

- each of said endwalls having a number of gates defining a corresponding number of different sized coaxial apertures, each gate being defined by a pair of symetrical, rigid flaps wherein each aperture corresponds to one of said different cross-sectional sizes of one of said elongated elements,
- each flap of said pair of flaps having opposite vertical edges, a first vertical edge being arranged on one side of each flap and said second vertical edge being arranged on an opposite side of each flap,
- the first vertical edge defining a notch having the shape of one-half of the cross-sectional size of one of said elongated elements, and
- the second vertical edge having pivot means cooperating with said elongated enclosure for allowing displacement of each flap of said pair of flaps from a closed position to an open position, the closed position of each pair of flaps lying in a substantially planar configuration and defining in a center portion of one of said endwalls one of said coaxial apertures, the open position of each pair of flaps extending longitudinally of said elongated enclosure and cooperating with an adjacent pair of rigid flaps in the closed position and located in the same endwall, wherein said adjacent pair of flaps form an adjacent gate defining another one of said number of different sized coaxial apertures.

* * * * *